United States Patent [19]

Cardoos, Jr. et al.

[11] Patent Number: 5,237,361
[45] Date of Patent: Aug. 17, 1993

[54] FILM DISPENSER WITH IMPROVED ARTICULATED CATCHER

[75] Inventors: Nicholas Cardoos, Jr., Bedford; Philip R. Norris, North Reading, both of Mass.

[73] Assignee: Polaroid Corporation, Cambridge, Mass.

[21] Appl. No.: 889,628

[22] Filed: May 28, 1992

[51] Int. Cl.⁵ .......................................... G03D 13/02
[52] U.S. Cl. .................................................. 354/333
[58] Field of Search ...................... 354/86, 275, 333; 355/321

[56] References Cited

U.S. PATENT DOCUMENTS

| | | | |
|---|---|---|---|
| 4,800,400 | 1/1989 | Douglas | 346/107 R |
| 4,847,632 | 7/1989 | Norris | 346/107 R |
| 4,985,714 | 1/1991 | Norris | 346/107 R |

Primary Examiner—D. Rutledge
Attorney, Agent, or Firm—Ralph R. Veseli; Edward S. Roman

[57] ABSTRACT

A dispenser of film units is operative with a film processing apparatus enclosed within a housing. The housing includes a front sidewall having an exit slot for the delivery of film units, the dispenser including a film ejection device located behind the slot for ejecting film units out of the housing via the slot. The ejection device may include rotating pressure rolls which may also serve a function in the film processing. The dispenser includes a catcher constructed of a four-bar mechanical linkage, and includes a spring urging the catcher from an extended state away from the sidewall to a retracted state contiguous to the sidewall. The catcher is supported pivotally by a strut assembly which pivots from the sidewall and connects to pivots on both the catcher and the sidewall. A flap interconnects the tray with the sidewall. An articulation pivot permits a folding of the flap against the tray during retraction of the catcher. Force exerted by an exiting film unit overcomes the retractive spring force to deflect the tray to the extended catcher state. A pair of flexible hooks in the tray rotate so as to hold side edges of the film units flat against the tray and so as to prevent a folding of the flap against the tray. Retraction is inhibited by the presence of the film unit in the catcher, and proceeds automatically by removal of the film unit from the catcher tray.

8 Claims, 5 Drawing Sheets

FILM DISPENSER WITH IMPROVED ARTICULATED CATCHER

FIELD OF THE INVENTION

This invention relates to a dispenser of film units from a film processing apparatus and, more particularly, to an improvement for an articulated film catching dispenser positioned at an output film-delivery slot of the apparatus wherein a pair of flexible hooks rotate and engage the side edges of film units so as to hold the film units flat against a tray during the extended state of the catcher.

BACKGROUND OF THE INVENTION

There is considerable interest in apparatus operable with film units adapted for so-called instant photography wherein each film unit is constructed integrally with a packet of film-developing chemicals. Such apparatus are disclosed in Douglas, U.S. Pat. No. 4,800,400; Norris, U.S. Pat. No. 4,847,632; Norris, U.S. Pat. No. 4,804,982; and Norris, U.S. Pat. No. 4,985,714. In such film processing apparatus, an optical system illuminates a photosensitive film so as to develop images on the film. Each film unit is then advanced to a printing station which has pressure driving rollers which grasp a leading edge of the film unit and dispose onto the film unit developing chemicals from a chemical holding packet of the film unit. While specific configurations of the film processing apparatus may vary, one class of apparatus that is of considerable importance employs a film slot positioned along a path of film conveyance at a location following the pressure driving rollers. This location of the exit slot presents a manufacturing convenience in that rotation of the rollers serves to deliver a processed film unit via the exit slot to persons who wish to receive the processed film units.

From the User's standpoint, it is highly desirable that such apparatus present successive film units in a manner allowing the User to either temporarily store or to withdraw selected dispensed film units. Moreover, it is desirable that an arrangement for providing these operations occupy a minimum of space, be of simple construction, be effective, and be low in cost.

A number of system approaches for film delivery have been provided with photographic cameras of the instant-development type. Examples of such systems are disclosed in U.S. Pat. Nos. 2,467,320; 3,653,308; and 3,748,990.

Of particular interest and convenience is a film printer apparatus with an articulated catcher assembly disclosed in the aforementioned U.S. Pat. No. 4,985,714 by Norris. Therein, a dispenser is operative with a film exit slot and film ejection rollers of a film processing apparatus. The dispenser has a general configuration of a four-bar mechanical linkage wherein one bar of the linkage is formed by a sidewall of a housing enclosing the film processing apparatus. An exit slot is provided in the sidewall for discharge of the film units from the housing. Some form of ejection device, such as rotating pressure driving rollers, is provided to forcibly deliver film units via the slot outward from the housing The dispenser includes a catcher formed by a tray pivotally supported by a strut assembly, both of which swing outward from the sidewall. The tray is connected in articulating fashion by a flap to the sidewall The tray, the strut assembly, and the flap constitute, respectively, a second bar, a third bar, and a fourth bar of the foregoing four-bar linkage. Upon an outward swinging of the strut assembly, the tray and the flap extend forward of the sidewall in a substantially coplanar relationship for support of the film units. Upon swinging of the strut assembly back towards the sidewall, the tray and flap fold against each other, in orientations essentially parallel to the sidewall, in a compact retracted state of the catcher. The tray is sufficiently long to extend along the sidewall beyond the slot so as to serve as a door for closing the slot in the retracted state of the catcher. Also included in the dispenser is a prestressed spring which continually urges the catcher from the extended state to the retracted state.

Automatic operation of the catcher is obtained by directing exiting film units towards the tray for urging the tray away from the sidewall The film units have sufficient beam strength, namely, resistance to bending, to overcome the retractive force of the prestressed spring Thus, upon ejection of a film unit against the tray, the strut assembly swings outward away from the sidewall allowing the tray and the flap to assume the extended substantially coplanar orientation for support of the film unit. In order to retain the catcher in the extended state against the retractive force of the spring, even after a film unit has been fully ejected from the slot to be totally supported by the catcher, a rigid hook assembly integrally formed with the tray slidably grips the side edges of the film unit as the film unit exits the slot to lie upon the tray. In this way, the first ejected film unit is held against a coplanar surface of the tray. As noted above, the beam strength of the film unit is sufficient to overcome the retracted force of the prestressed spring so as to prevent the folding of the flap against the tray. Thus, the catcher is immobilized by the presence of the first ejected film unit. Subsequent film units can readily stack upon the first film unit and the catcher which thereby stores the film units in a position which allows a person to examine selected ones of the film units. Upon removal of all of the film units from the catcher, the flap is then free to fold against the tray in response to the prestressed spring. Thus, the prestressed spring urges articulation of the catcher to the retracted state.

The foregoing Norris catcher assembly is convenient to use because the four-bar linkage can be activated by pressure of the leading edge of an ejected film unit to spring from the retracted state to the extended state. Excessive film units then stack up upon the extended tray and retraction of the catcher is brought about by the removal of the film units from the catcher. Thus, the catcher assembly is fully automated.

However, the Norris catcher assembly suffers from the disadvantage in that it is sometimes prone to image-destroying jams. After the first film unit slides under the rigid hooks so as to keep the catcher in the extended state, subsequently emerging film units can also slip underneath the rigid hooks until all the clearance between the rigid hooks and the catcher is occupied and a jam occurs.

SUMMARY OF THE INVENTION

The aforementioned problem is overcome and other advantages are provided by replacing the rigid hook assembly with a flexible hook assembly. The flexible hook assembly replaces the rigid hook assembly so that the side edges of the first and subsequent film units can slide under the flexible hooks without jamming the catcher or without damaging the film units. This is accomplished by a pair of flexible hooks which engage the side edges of the first film unit in the same manner as in the earlier Norris catcher assembly so as to hold the first film unit against the coplanar surface of the tray and to keep the catcher in the extended state. Subsequently ejected film units, however, can either (a) slide under the pair of flexible hooks so that the flexible hooks rotate and engage the side edges of the film units without causing damage to the film units or (b) slide over the pair of flexible hooks and stack over the first film unit in the conventional manner. Upon removal of all the film units from the catcher, the flexible hooks rotate back to their original position as the flap folds against the tray in response to the retractive force of the prestressed spring.

The flexible hook assembly is fixably secured to the tray and is comprised of a unitary wire member that is loosely retained in a molded channel in the tray by a keeper strip which is disposed over and secured to the tray. The unitary wire member is bent to form: (a) a central portion, (b) two torsion bar portions which extend obliquely or perpendicularly to the central portion, and (c) two hook portions which extend obliquely or perpendicularly to the torsion bar portions and extend substantially in parallel to the central portion. Each hook portion further comprises a flexible hook which is disposed over the keeper strip for engaging the side edges of the film units so as to hold the film units flat against the tray during the extended state of the catcher. When the first film unit is ejected from the slot and onto the catcher, a front surface of the film unit slides between the tray and the pair of flexible hooks so that the flexible hooks engage the sides of the film unit and keep the catcher in the extended state. Subsequently ejected film units which slide between the tray and the pair of flexible hooks cause the flexible hooks to rotate and engage the side edges of the film units without causing damage to the film units. When the flexible hooks rotate, the associated torsion bar portions deflect in response to the torque which causes the central portion to bow and to press against the keeper strip. The wire member is formed of material which can repeatedly torsionally deflect and return to its original position without any permanent deformation in the material. The material for the wire member includes plastic, copper, bronze, steel, and mixtures thereof.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENTS

With reference to FIGS. 1-5 there is shown a portion of film processing apparatus 10 suitable for the practice of the invention. By way of example, the apparatus 10 comprises a housing 12 with a cassette 14 therein for holding a stack of film units 16, each of which has an image to be printed. By way of example, a film unit 16 may be of the instant photography type, such as that manufactured by the POLAROID CORPORATION of Cambridge Massachusetts, wherein the film unit 16 includes a packet 18 of developer chemicals for use in developing the film unit 16 to obtain a print of the image on the film unit 16. The cassette 14 may also be of a well known form used in the processing of the foregoing type of film units and is operative with a known film-picking mechanism (not shown) which urges a bottom-most exposed film unit 16 through an aperture 20 in the cassette 14 to a pair of pressure rollers 22 and 24. The rollers 22 and 24 rotate, as indicated by arrows, to grab a leading edge of the film unit 16, and to advance the film unit 16 along a path 26 indicated by a dashed line. There is a small gap (not shown) between the rollers 22 and 24 by which the rollers 22 and 24 can receive the packet 18 at the leading edge of the film unit 16 and spread the developer chemicals along the film unit 16 as the unit 16 advances between the rollers. As is well known, the spreading of the developer chemicals serves to develop the film to produce a print on the film unit 16.

The rollers 22 and 24 serve the dual functions of participating in the processing of the film units 16, and also in ejecting processed film units 16 via an exit slot 28 in a sidewall 30 of the housing 12 to a person using the apparatus 10. Therefore, the rollers 22 and 24 may be regarded as constituting a part of a film ejector 32 which ejects processed film units 16 via the slot 28. The ejector 32 further comprises a pair of friction type film transfer wheels 34 operative with a guide element 36 located down the path 26 from the rollers 22 and 24. The two rollers 22 and 24, the wheels 34, and the guide element 36 operate to direct a film unit 16 with a predetermined orientation as the film unit 16 exits the slot 28. The slot 28 is provided with a flexible cover flap 38 which is deflected away from the path 26 by the leading edge of a film unit 16. For convenience in use, the ejector 32 may be provided with an arm 40 which engages with a pivot 42 located on a bottom wall 44 of the housing 12. The arm 40 allows the ejector 32 to be pivoted away from the remainder of the housing 12 to provide an access port for placing the cassette 14 in the housing 12. Upon a pivoting of the ejector 32 back into the position shown in FIGS. 3-4, the ejector 32 acts as a closure element or door of the housing 12.

Figure 1:
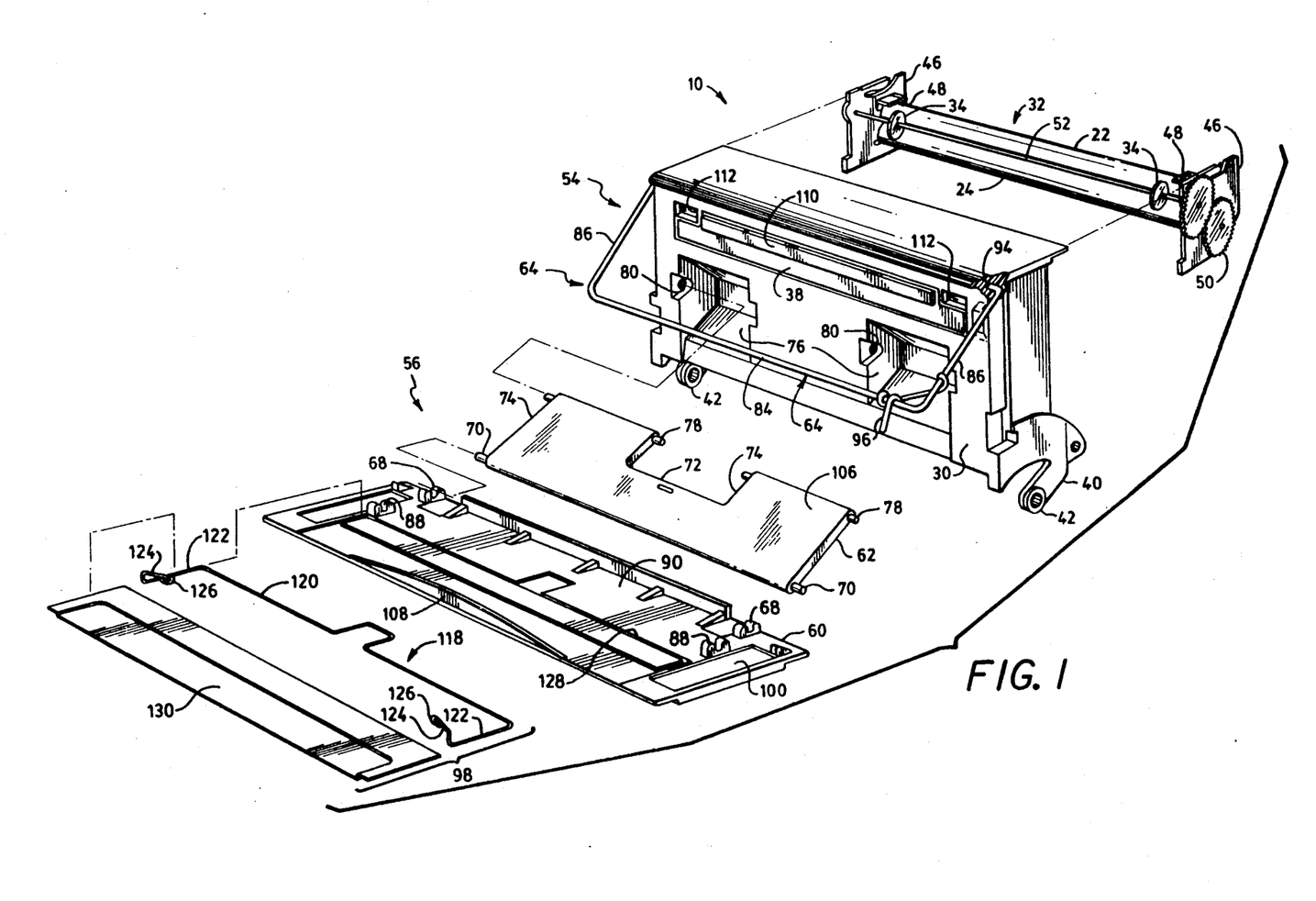
FIG. 1 is an exploded view of a dispenser constructed in accordance with the invention.
Figure 2:
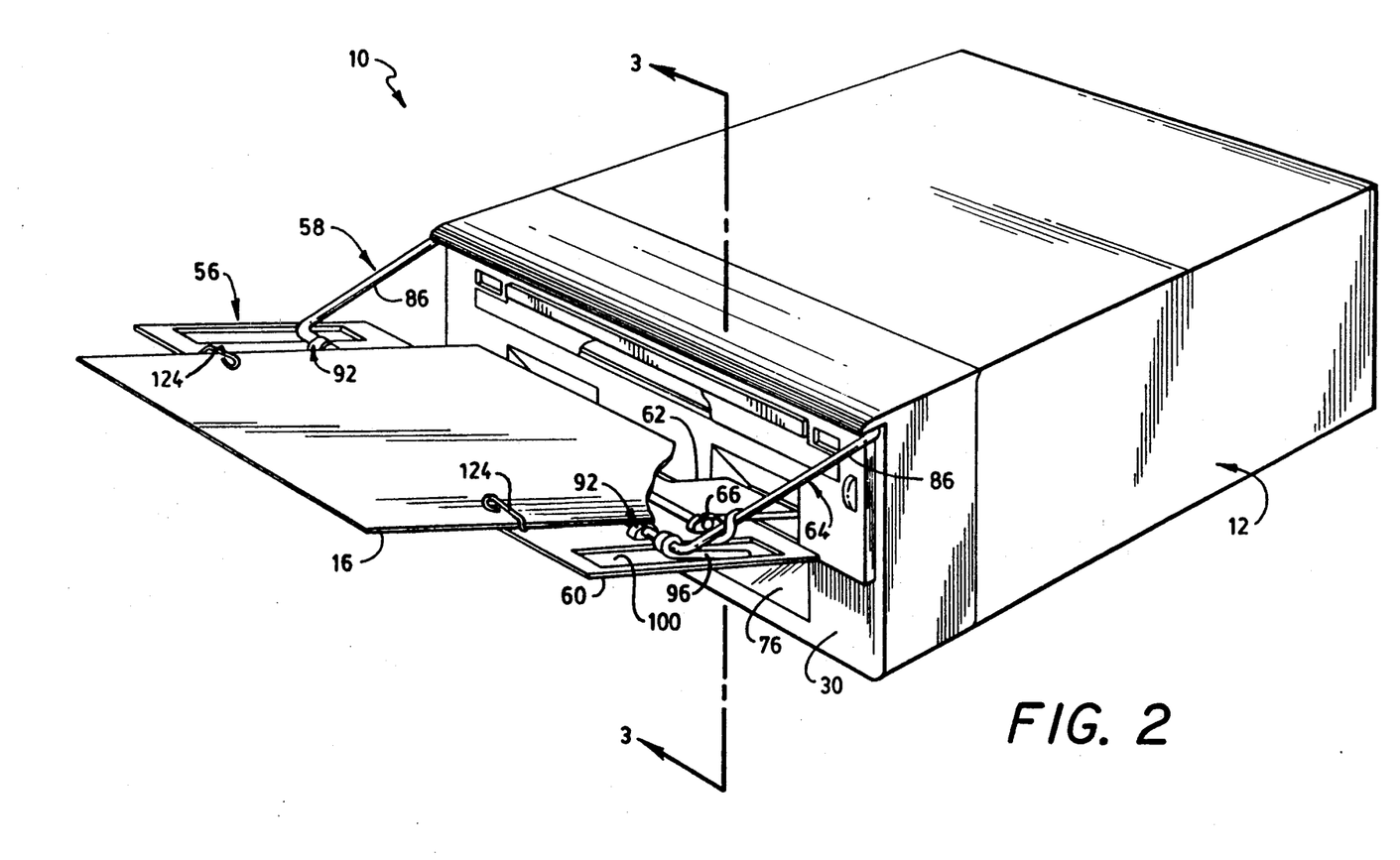
FIG. 2 is a perspective view of a housing which encloses the film-processing apparatus, the housing having a front sidewall supporting a catcher of the dispenser in an extended state for supporting a film unit.
Figure 3:
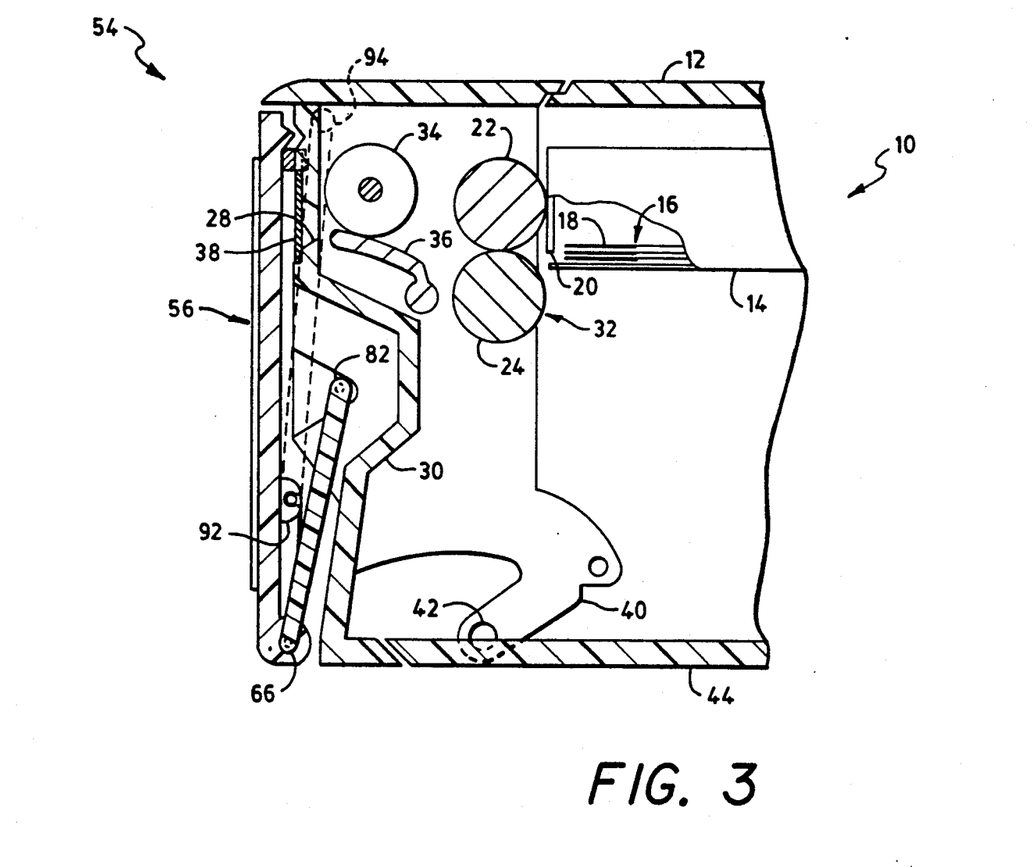
FIG. 3 is a sectional view, taken along the line 3—3 in FIG. 2, showing a front portion of the housing with a portion of the film processing apparatus including an ejection device enclosed by the housing, the view also showing the catcher in a retracted state.

The operation of the rollers 22 and 24 and the wheels 34 is described in the aforementioned Norris catcher assembly described in U.S. Pat. No. 4,985,714. Briefly, as shown in FIG. 1, the rollers 22 and 24 are supported rotatably by brackets 46. Springs 48 are attached to the bracket 46 to urge the roller 24 against the roller 22 for spreading the chemicals from the packet 18 during passage of a film unit 16 between the rollers 22 and 24. Gearing 50 connects the rollers 22 and 24 to a motor (not shown) to impart rotation to the rollers 22 and 24. A drive shaft 52 supports the wheels 34 and connects with the gearing 50 to rotate the wheels 34. The wheels 34 are located on the shaft 52 at positions for engagement with opposed side edge regions of each film unit 16.

The apparatus 10 is provided with a dispenser 54 which includes the ejector 32, and further comprises a catcher 56 mounted to the housing 12 in front of the sidewall 30 for receiving film units 16 dispensed via the slot 28. The catcher 56 supports dispensed film units 16 at a place of convenience for a person using the apparatus 10, and allows the person to select individual ones of the film units 16.

The catcher 56 is constructed in the basic configuration of a four-bar mechanical linkage 58. One element of the linkage 58 is the sidewall 30. The other three elements of the linkage 58 are a tray 60, a flap 62, and a strut assembly 64. The four elements are pivotally connected to each other so as to permit the catcher to be extended from the housing 12 to an extended state for support of film units 16, and to be retracted to a retracted state in which the four elements are in a compact articulated configuration at the front of the housing 12.

Figure 4:
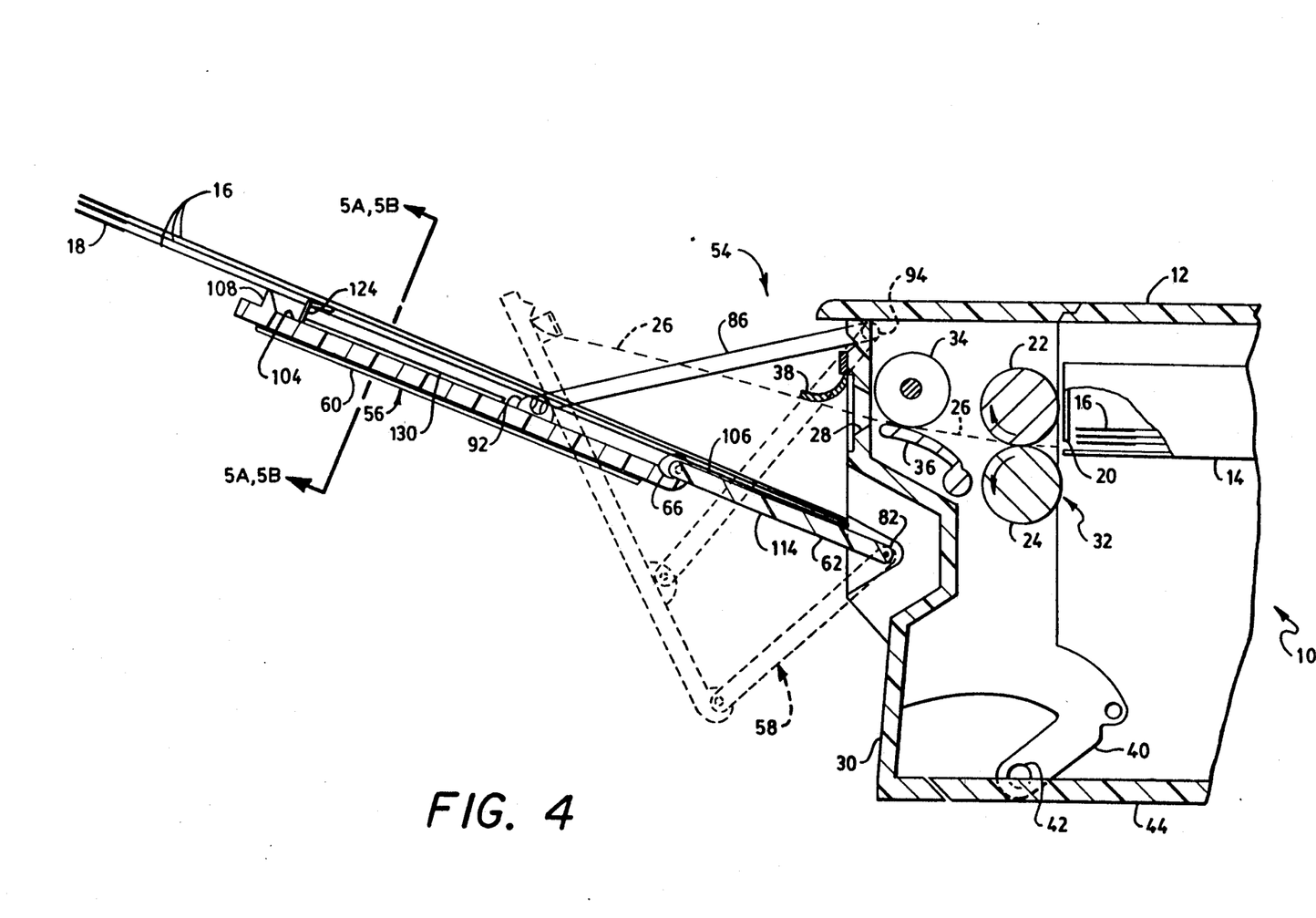
FIG. 4 is a sectional view, similar to that of FIG. 3, but with the catcher in an extended state.

The tray 60 and the flap 62 are joined by an articulation pivot 66 which joins a proximal edge region of the tray 60 to a distal edge region of the flap 62. The pivot 66 allows the flap 62 to fold against the tray 60 in the retracted state (FIG. 3), and to extend in a substantially coplanar configuration with the tray 60 in the extended state (FIG. 4). The pivot 66 comprises a pair of brackets 68 located on opposite sides of the tray 60 and a pair of pins 70 located on opposite sides of the flap 62 and received by the brackets 68. The pivot 66 allows pivoting in a range of from zero degrees, in the retracted state, to approximately 180 degrees, in the extended state, the latter pivot limitation arising from a contacting of the proximal edge of the tray 60 with a backside of the distal edge region of the flap 62.

The proximal edge region of the flap 62 is constructed with a notch 72 which defines two legs 74 which extend into recesses 76 in the sidewall 30. The legs 74 are provided with pins 78 which fit into sockets 80 in the recesses 76 to form pivots 82 by which the flap is pivotally connected to the sidewall 30.

The strut assembly 64 is formed as a single wire which is bent to form a central portion 84 and two struts 86 which extend perpendicularly to the central portion 84. Brackets 88 are located on a middle portion 90 of the tray 60, and engage the central portion 84 to form pivots 92 which pivotally secure the central portion 84 to the middle portion 90 of the tray 60. The struts 86 extend from the brackets 88 to pivots 94 located at the upper outer corners of the sidewall 30.

Automatic extension and retraction of the catcher 56 is provided by a spring 96, and a flexible hook assembly 98 disposed on the tray 60 and retracted from edges of the tray 60 for engagement with edges of a film unit 16. The spring 96 is formed of a segment of spring steel wire secured to the strut assembly 64 by coiling a portion of the wire around an end of the central portion 84 and looping an end of the wire around the contiguous strut 86 to establish a firm mounting of the spring 96 to the strut assembly 64. In the exploded view of FIG. 1, wherein the components of the catcher are shown separated from each other, the spring 96 is portrayed in its unstressed state. In the assembled view of the catcher 56 in FIG. 2, the spring 96 is shown in its operating configuration wherein the spring 96 is bent into a stressed state with an end of the spring 96 being located in a depression 100 of the tray 60 for urging the tray 60 to pivot via the pivots 92 about the central portion 84 to the retracted state of the catcher 56. The spring 96 is biased in all positions of the catcher 56 to urge the catcher 56 toward the retracted state.

In accordance with the present invention, the flexible hook assembly 98 is secured to the top surface 104 (FIG. 4) of the tray 60. The flexible hook assembly 98 includes a unitary wire member 118 that is loosely retained in a molded channel 128 in the tray 60 by a keeper strip 130 which is disposed over and secured to the tray 60 by an adhesive (not shown). The unitary wire member 118 is bent to form: (a) a central portion 120, (b) two torsion bar portions 122 which extend obliquely or perpendicularly to the central portion 120, and (c) two hook portions 124 which extend obliquely or perpendicularly to the torsion bar portions 122 and extend substantially in parallel to the central portion 120. Each hook portion 124 further comprises a flexible hook 126 which is disposed over the keeper strip 130.

The tray 60 has sufficient length, between its proximal and distal edges, to extend over the film-exit slot 28 in the sidewall 30, in the retracted state of the catcher 56 (FIG. 3), so as to serve as a door which closes over the slot 28. With reference to the retracted state, the flexible hooks 126 are located between the slot 28 and the distal edge of the tray 60. Therefore, an exiting film unit 16 strikes the tray 60 at a location between the flexible hooks 126 and the pivots 92 for urging the tray 60 away from the sidewall 30 to extend the catcher 56. The location of the flexible hooks 126 is retracted from the distal edge of the tray 60 to enable a clamping of a film unit 16 to a top surface of the catcher 56, as shown in FIG. 4, the top surface of the catcher 56 being a composite of the top surfaces 104 and 106 of the tray 60 and the flap 62, respectively. A ramp 108 is located on the top surface 104 of the tray 60 between the flexible hooks 126 and the distal edge of the tray 60, and extends outward from the tray 60 to engage the leading edge of the film unit 16 during extension of the catcher 56.

In operation, a film unit 16 exiting from the slot 28 automatically extends the catcher 56 to the extended state, and maintains the catcher 56 in the extended state until removal of the film unit 16 at which time the spring 96 returns the catcher 56 to the retracted state. If desired, a magnet 110 may be mounted to the top of the sidewall 30, at a location in registration with the keeper strip 130 in the retracted state, to magnetically attract the keeper strip 130 for securing the tray 60 to the sidewall 30 during the retracted state. For use with the magnet 110, the keeper strip 130 is to be fabricated of iron or steel, such as spring steel, so as to be attracted to the magnet 110. The tray 60, the flap 62, and elements of the housing 12 may be fabricated of nonmagnetic material, preferably plastic. Recesses 112 are provided in the sidewall 30 for receiving the flexible hooks 126 during the retracted state.

The extension of the catcher 56 begins with contact of the leading edge of an exiting film unit 16 with the tray 60. The beam strength, or stiffness, of the film unit 16 is great enough to overcome forces of the spring 96 and the magnet 110 to swing the tray 60 away from the sidewall 30. The pivots 92 are located in a region approximately from one-quarter to one-half the distance, preferably one-third the distance, from the proximal edge to the distal edge of the tray 60 to facilitate a pivoting of the tray 60 about the pivots 92 and 66 for opening the catcher 56 to the extended state. As the catcher 56 opens, the leading edge of the film unit 16 slides through the flexible hooks 126 to contact the ramp 108. The ramp 108 serves as a bumper to retain the leading edge of the film unit 16 in engagement with the tray 60 to ensure continued pivoting of the tray 60 during the initial stages of the extension of the catcher 56. During the final stages of ejection of the film unit 16 and of extension of the catcher 56, the leading edge of the film unit 16 slides up and over the ramp 108, which operates to bow the film 16 as best shown in the cross-sectional view of FIG. 5A. The trailing edge of the film unit 16 thereafter drops down upon the flap 62 to assume the position of film unit shown in FIG. 4. The catcher 56 is now in the fully extended position.

Figure 5A:
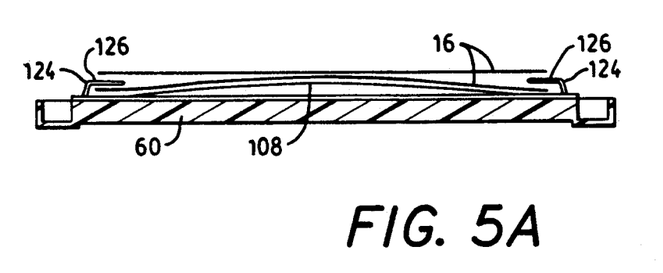
FIG. 5A is a sectional view taken along the lines 5A—5A in FIG. 4.

In the extended state of FIG. 4, it is noted that the leading edge of the film unit 16 no longer pushes against the tray 60 to overcome the force of the spring 96. Nevertheless, the spring 96 is unable to retract the catcher 56 because the film unit 16 is acting as a locking member for locking the catcher 56 in the extended state. As shown in FIG. 4, a front portion of the film unit 16 is clamped between the hook portion 124 (only one of the hook portions being visible in this view) and the ramp 108. This clamping forces a rear portion of the film unit 16 against the flap 62 to prevent articulation at the pivot 66. As a result, the spring 96 is ineffective to fold the catcher 56. The catcher 56 is retained in its extended state to allow further ejected film units 16 to stack up upon the first film unit which is serving as the locking member. Also, the bowing of the first film unit by the ramp 108 as shown in FIG. 5A may allow the succeeding film units to be ejected over the flexible hooks 126 without damaging the film units. A person using the film processing apparatus 10 is free to inspect film units delivered by the ejector 32 to the catcher 56.

Figure 5B:
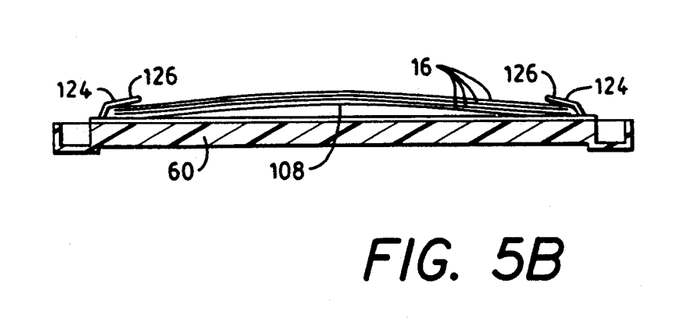
FIG. 5B is a sectional view taken along the lines 5B—5B in FIG. 4.

Alternatively, as shown in FIG. 5B, subsequently ejected film units may slide between the tray 60 and the pair of flexible hooks 126 which causes the flexible hooks 126 to rotate and engage the side edges of the film units 16 without causing damage to the film units. When the flexible hooks 126 rotate, the associated torsion bar portions 122 (FIG. 1) torsionally deflect in response to the torque which causes the central portion 120 (FIG. 1) to bow and press against the keeper strip 130 (FIG. 1). The wire member 118 (FIG. 1) is formed of material which can repeatedly torsionally deflect and return to its original position without any permanent deformation in the material. The material for the wire member 118 (FIG. 1) includes plastic, copper, bronze, steel, and mixtures thereof.

Other embodiments of the invention including additions, subtractions, deletions, and other modifications of the preferred disclosed embodiments of the invention will be obvious to those skilled in the art and are within the scope of the following claims.

What is claimed is:

1. An improvement for a dispenser of film units delivered by film processing apparatus enclosed in a housing of the type comprising:

a sidewall of the housing and an exit slot in the sidewall, the exit slot serving for discharge of the film units from the housing;

ejection means disposed in the housing for ejecting individual ones of the film units from the housing by the slot; and a catcher having retracted and extended states relative to the housing, the catcher having a tray and being mounted to the housing outside the sidewall, the catcher being extendible from the housing to the extended state for catching individual ones of the film units on the tray upon passing of the film units via the slot, the catcher closing the tray against the sidewall upon a retraction of the catcher to the retracted state, the catcher further comprising a spring biased in all positions of the catcher to urge the catcher into the retracted state, the ejecting means urging individual ones of the film units against the tray with sufficient force to overcome a retractive force of the spring and to deflect the tray away from the sidewall for supporting individual ones of the film units, deflection of the tray placing the catcher in the extended state, the tray engaging with an individual one of the film units for maintaining the catcher in the extended state, the spring automatically retracting the catcher upon an emptying of the tray of film units;

the improvement comprising:

a) a molded channel in the tray;

b) a keeper strip disposed over the molded channel and secured to the tray; and c) a wire member disposed loosely in the molded channel, the wire member being bent to form a central portion, two torsion bar portions which extend obliquely to the central portion, and two hook portions which extend obliquely to the torsion bar portions and extend substantially in parallel to the central portion, each hook portion further comprising a flexible hook which is disposed over the keeper strip for engaging the side edges of the film units so as to hold the film units flat against the tray during the extended state of the catcher.

2. The improvement of claim 1 wherein each flexible hook is disposed obliquely with respect to a leading edge of the film unit.

3. The improvement of claim 1 wherein the wire member is formed of material which can repeatedly torsionally deflect to a position approximately perpendicular to the keeper strip and then repeatedly return to a position approximately parallel to the keeper strip without causing any permanent deformation of the wire member.

4. The improvement of claim 3 wherein the material for the wire member is selected from the group comprising plastic, bronze, steel, copper, and mixtures thereof.

5. An improvement for a dispenser of film units delivered by film processing apparatus enclosed in a housing of the type comprising:

a sidewall of the housing and an exit slot in the sidewall, the exit slot serving for discharge of the film units from the housing;

ejection means disposed in the housing for ejecting individual ones of the film units from the housing by the slot; and a catcher having retracted and extended states relative to the housing, the catcher having a tray and being mounted to the housing outside the sidewall, the catcher being extendible from the housing to the extended state for catching individual ones of the film units on the tray upon passing of the film units via the slot, the catcher closing the tray against the sidewall upon a retraction of the catcher to the retracted state, the catcher further comprising a spring biased in all positions of the catcher to urge the catcher into the retracted state, the ejecting means urging individual ones of the film units against the tray with sufficient force to overcome a retractive force of the spring and to deflect the tray away from the sidewall for supporting individual ones of the film units, deflection of the tray placing the catcher in the extended state, the tray engaging with an individual one of the film units for maintaining the catcher in the extended state, the spring automatically retracting the catcher upon an emptying of the tray of film units;

the improvement comprising:
a) a molded channel in the tray;
b) a keeper strip disposed over the molded channel and secured to the tray; and
c) a wire member disposed loosely in the molded channel, the wire member being bent to form a central portion, two torsion bar portions which extend perpendicularly to the central portion, and two hook portions which extend perpendicularly to the torsion bar portions and extend in parallel to the central portion, each hook portion further comprising a flexible hook which is disposed over the keeper strip for engaging the side edges of the film units so as to hold the film units flat against the tray during the extended state of the catcher.

6. The improvement of claim 5 wherein each flexible hook is disposed obliquely with respect to a leading edge of the film unit.

7. The improvement of claim 5 wherein the wire member is formed of material which can repeatedly torsionally deflect to a position approximately perpendicular to the keeper strip and then repeatedly return to a position approximately parallel to the keeper strip without causing any permanent deformation of the wire member.

8. The improvement of claim 7 wherein the material for the wire member is selected from the group comprising plastic, bronze, steel, copper, and mixtures thereof.

* * * * *